(12) United States Patent
Taylor et al.

(10) Patent No.: US 8,287,715 B2
(45) Date of Patent: Oct. 16, 2012

(54) SYNTHESIS OF BORON USING MOLTEN SALT ELECTROLYSIS

(75) Inventors: Patrick R. Taylor, Lakewood, CO (US); Judith C. Gomez, Lakewood, CO (US)

(73) Assignee: Colorado School of Mines, Golden, CO (US)

( * ) Notice: Subject to any disclaimer, the term of this patent is extended or adjusted under 35 U.S.C. 154(b) by 152 days.

(21) Appl. No.: 12/780,382

(22) Filed: May 14, 2010

(65) Prior Publication Data

US 2010/0294670 A1 Nov. 25, 2010

Related U.S. Application Data

(60) Provisional application No. 61/179,591, filed on May 19, 2009.

(51) Int. Cl.
*C25B 1/00* (2006.01)

(52) U.S. Cl. ........................................................ 205/410

(58) Field of Classification Search ................ 205/410
See application file for complete search history.

(56) References Cited

U.S. PATENT DOCUMENTS

| | | | |
|---|---|---|---|
| 2,033,172 A * | 3/1936 | Andrieux .................... | 205/363 |
| 2,572,248 A | 10/1951 | Cooper et al. | |
| 2,572,249 A | 10/1951 | Cooper et al. | |
| 2,832,730 A | 4/1958 | Nies et al. | |
| 2,848,396 A | 8/1958 | Murphy et al. | |
| 2,897,056 A | 7/1959 | Nies et al. | |
| 2,909,471 A | 10/1959 | Nies | |
| 2,918,417 A | 12/1959 | Cooper et al. | |
| 2,984,605 A | 5/1961 | Cooper et al. | |
| 3,030,284 A | 4/1962 | Stern | |
| 4,108,743 A * | 8/1978 | Minck ........................... | 205/367 |
| 4,874,482 A * | 10/1989 | Honders et al. ............... | 205/354 |
| 5,215,631 A * | 6/1993 | Westfall ....................... | 205/351 |

OTHER PUBLICATIONS

Chartrand et al, "Thermodynamic Evaluation and Optimization of the LiF-NaF-KF-MgF2-CaF2 System Using the Modified Quasi-Chemical Model", Metallurgical and Materials Transactions A, vol. 32A, Jun. 2001, pp. 1385-1396.*
Abu-Hamed et al., "The use of boron for thermochemical storage and distribution of solar energy", Solar Enegy., 2007, vol. 81, pp. 93-101.
Andrieux, "Electrolytic production of boron and its alloys," Revue de Metallurgie, 1935, vol. 32, pp. 487-493.
Andrieux, "Recherches sur l'electrolyse de oxides metalliques dissous dans lánhydride borique ou dans les borates fondus: Nouvelles methods de preparation du bore amorphe, des borures et de quelques metaux," Ann. de Chim., 1929, vol. 10, No. 12, pp. 423-462.
Barner et al., "Vibrational spectroscopic study on fluorooxoborate formation in fluoride melts: Indication of $B_2OF_6^{2-}$ and $B_3O_3F_6^{3-}$," Journal of Molecular Liquids.,1999, vol. 83, pp. 141-151.
Barth et al., "Boron Neutron Capture Therapy of Cancer," Cancer Research, 1990, vol. 5, pp. 1061-1070.

(Continued)

*Primary Examiner* — Harry D Wilkins, III
(74) *Attorney, Agent, or Firm* — Sheridan Ross, P.C.

(57) ABSTRACT

The invention relates generally to elemental boron, particularly to elemental boron having a high purity level and to a method of recovering elemental boron by the electrolysis of a molten boron-containing electrolyte.

21 Claims, 10 Drawing Sheets

OTHER PUBLICATIONS

Barth, "A Critical Assessment of Boron Neutron Capture Therapy: An Overview," Journal of Neuro-Oncology, 2003, vol. 62, No. 1, pp. 1-5.

Blumenthal, "Determination of boron in metal borides", Analytical Chemistry., Jul. 1951, vol. 23, No. 7, pp. 992-994.

Borresen et al., "Electrodeposition of magnesium from halide melts-charge transfer and diffusion kinetics", Electrochimica Acta., vol. 42, No. 10, pp. 1613-1622, 1997.

Encarta Encyclopedia: Boron, available at http://encarta.msn.com/encyclopedia_761571567/Boron.html, accessed Mar. 28, 2009.

Ett et al., "Pulse current plating of TiB2 in molten fluoride", Electrochimica Acta., 1999, vol. 44, pp. 2859-2870.

Fouassier et al., "Notes on the valence force field of BF4 ion", Journal of Molecular Spectroscopy., 1971, vol. 39, pp. 525-526.

Grinevitch et al., "Electrode and chemical reactions during electrodeposition of tantalum products in CsCl melt," Electrochimica Acta, 2006, vol. 51, pp. 6563-6571.

Kahlenberg, "Boron and boron suboxide", 47th American Electrochemical Society Meeting Proceedings., Niagara Falls., 1925, pp. 23-63.

Katayama et al., "Electrodeposition of Cobalt from an Imide-Type Room-Temperature Ionic Liquid," J. Electrochem. Soc., 2007, vol. 154, No. 10, pp. D534-D537.

Kellner, "Electrodeposition of coherent boron," J. Electrochem. Soc., 1973, vol. 120, No. 6, pp. 713-716.

Kisza et al., "Kinetics and mechanism of the magnesium electrode reaction in molten magnesium chloride," J. Appl. Electrochemistry, 1995, vol. 25, pp. 940-946.

Kontoyannis, "Pyrolytic boron nitride coated graphite as a container of reference electrodes for molten fluorides," Electrochimica Acta, 1995, vol. 40, No. 5, pp. 2547-2551.

Kumashiro et al., "The preparation and thermoelectric properties of molten salt electrodeposited boron wafers," J. Solid State Chemistry, 2004, vol. 177, pp. 537-541.

Makyta et al., "Mechanism of the cathode process in the electrolytic boriding in molten salts," Electrochimica Acta, 1984, vol. 29, No. 12, pp. 1653-1657.

Malyshev, "Electrochemical Processes and Implementation of Molybdenum Electrodeposition in Melts," Russian Metallurgy (Metally), 2006, No. 2, pp. 126-132.

Matiasovsky et al., "Electrochemical and thermochemical boriding in molten salts," Surface and Coatings Technology, 1988, vol. 35, pp. 133-149.

McCarty et al., "A new crystalline modification of boron," J. Am. Chem. Soc., 1958, vol. 80, No. 10, p. 2592.

Miller, "Electrolytic production of boron," J. Electrochem. Soc., 1959, vol. 106, No. 9, pp. 815-819.

Nair et al., "The Production of elemental boron by fused salt electrolysis," Mineral Processing and Extractive Metallurgy Review, 1992, vol. 9, pp. 283-291.

Nies, "Preparation of boron by fused salt electrolysis," J. Electrochem. Soc., 1960, vol. 107, No. 10, pp. 817-820.

Perminov et al., "Theory, production technology, and properties of powders and fibers. Magnesium-thermal non-furnace production of boron from boron anhydride", Institute for the Physical and Chemical Principles of Processing Mineral Raw Material., Translated from Poroshkovaya Metallugiya., 1969, vol. 73, No. 1, pp. 1-5, 4 pages.

Polyak "Mineral Commodity Summaries." U.S. Geological Survey, Jan. 2009, 198 pages.

Polyakova et al., "Electrochemical behavior of boron in LiF-NaF-KF melts," J. Electrochem. Soc., 1996, vol. 143, No. 10, pp. 3178-3186.

SBBoron Corp. MACH I: "Pioneer in Nano-structure, Advanced Materials and Aerospace," available at http://www.sbboron.com/pdf/Mach1_SBIR.pdf, accessed Feb. 28, 2009.

Sharma et al., "Phase diagrams for the systems MgCl2-MgF2, CaCl2-MgF2, and NaCl-MgF2," Journal of the American Ceramic Society, 1969, vol. 52, No. 11, pp. 612-615.

Stefanidaki et al., "Electrodeposition of neodymium from LiF—NdF3—Nd2O3 melts," Electrochimica Acta, 2001, vol. 46, pp. 2665-2670.

Subramanian et al., "Development of boron and other boron compounds of nuclear interest", IANCAS Bulletin., Jul. 2005, pp. 237-244.

Taranenko et al., "Mechanism of the cathode process in the electrochemical synthesis of TiB2 in molten salts: II.—Chloride-fluoride Electrolytes," Electrochimica Acta, 1992, vol. 37, No. 2, pp. 263-268.

U.S. Department of Energy, Office of Industrial Technologies, Bulletin, 1997, Energy and Environmental Profile of the U.S. Aluminum Industry, Jul. 1997, 119 pages.

Walker et al., "Carbon determination in hyper-pure elemental boron utilizing gas chromatography," Analytical Chemistry, 1965, vol. 37, No. 2, pp. 299-300.

Weintraub, "Preparation and properties of pure boron," 16th American Electrochemical Society Meeting Proceedings, New York City, 1909, pp. 165-184.

Yannacakis et al., "Preparation of crystalline boron," Boron: Synthesis Structure, and Properties (J. A. Kohn, ed.), Plenum Press, Inc., New York, 1960, pp. 38-41.

Yukin, "Mechanisms of electroplating with boron," Metalloved. Term. Obrad. Met.,1971, vol. 8, p. 42.

Zhu et al., "The electrode kinetics of perfluorocarbon (PFC) generation," Light Metals, 1999., ASM International, 1999, pp. 241-246.

\* cited by examiner

SYNTHESIS OF BORON USING MOLTEN SALT ELECTROLYSIS

CROSS REFERENCE TO RELATED APPLICATION

The present application claims the benefit of U.S. Provisional Patent Application Ser. No. 61/179,591, filed May 19, 2009, entitled "Synthesis of Boron Using Molten Salt Electrolysis," which is incorporated herein by reference in its entirety.

FIELD OF THE INVENTION

The invention relates generally to a process for producing elemental boron, particularly to a process for producing elemental boron by electrolyzing an electrolyte comprising a boron-containing material.

BACKGROUND OF THE INVENTION

Boron is a Group IIIA element having properties between a metal and non-metal. Boron has unique characteristics of being: a) a hard, refractory solid; b) a metalloid; c) a semiconductor; d) light weight; e) high strength; f) high melting; g) a solid fuel material; h) and reactive with metals. Because of these unique characteristics, boron has industrial applications in the areas of ceramics, propulsions, pyrotechnics, metallurgy, nuclear, medical, and electronics to name a few. However, the unique characteristics of boron make it difficult to prepare elemental boron.

A method for preparing elemental boron by electrolysis of $B_2O_3$ in a molten salt of MgO and $MgF_2$ at 1100 degrees Celsius was reported by Andrieux in "Recherches sur l'électrolyse des Oxydes Métalliques Dissous dans L'ánhydride Borique ou dans les Borates Fondus: Nouvelles Méthodes de Préparation du Bore Amorphe, des Borures et de Quelques Métaux" (*Ann. de Chim.*, 10 (12): 423-462, 1929). The electrochemical produced boron contained magnesium as its main impurity.

U.S. Pat. No. 2,909,471 to Nies (hereafter Nies '471) discussed electrochemical production of elemental boron from an electrolyte containing KF, $MgF_2$, and $B_2O_3$, the entire contents of which is incorporated herein by this reference. The elemental boron contained appreciable quantities of magnesium. Nies '471 further described electrolytes comprising $KCl$—$KF$—$K_2O$—$B_2O_3$, $KCl$—$KBF_4$—$B_2O_3$, and $KCl$—$NaCl$—$NaF$—$B_2O_3$.

U.S. Pat. No. 2,832,730 to Nies (hereafter Nies '730) indicated optimal electrochemical production of elemental boron occurred in $KCl$—$KF$—$B_2O_3$ mixtures containing 10 wt % of $B_2O_3$, which is incorporated herein by reference in its entirety. The electrolysis was conducted between 775 to 925 degrees Celsius. Nies '730 further indicated poor electrode adhesion of elemental boron occurred in $KCl$—$KF$—$B_2O_3$ mixtures having less than 10 wt % $B_2O_3$ and mixtures having more than 10 wt % $B_2O_3$ were too viscous for electrolysis.

U.S. Pat. No. 2,984,605 to Cooper (hereafter Cooper) discussed electrochemical production of elemental boron from an electrolyte comprising $KBF_4$ and $B_2O_3$, which is incorporated herein by this reference in its entirety. The electrolyte contained between 2 to 15 wt % $B_2O_3$. The electrolysis was conducted between 600 to 750 degrees Celsius and produced oxygen and the elemental boron.

Yukin reported forming elemental boron by electrolyzing $Na_2B_4O_7$ ("Mechanisms of Electroplating with Boron" *Met-alloved. Term. Obrad. Met.*, 8: 42, 1971). The electrolysis produced sodium, which reacted with $B_4O_7^{2-}$ to produce elemental boron.

A three electron cathodic reduction of $BF_4^-$ in LiF—KF—$KBF_4$ and LiF—KF—$B_2O_3$ melts was reported by Makyta et al. in "Mechanism of the Cathode Process in the Electrolytic Boriding in Molten Salts" (*Electrochimica Acta.*, 29 (12): 1653-1657, 1984). The three electron cathodic reduction process is represented by the following chemical half-cell reaction:

$$BF_4^- + 3e^- \leftrightarrow B^0 + 4F^- \quad (1)$$

Moreover, Makyta et al. reported the $B_2O_3$ reacted with LiF—KF to form $KBF_4$, which formed elemental boron according to equation (1).

According to Polyakova, $B^{3+}$ is reduced to elemental boron in a single irreversible step in LiF—NaF—KF melts containing less than $5.7 \times 10^{-2}$ mole per cent of $KBF_4$ ("Electrochemical Behavior of Boron in LiF—NaF—KF Melts" published in *J. Electrochem. Soc.*, 143 (1): 3178-3186, 1996).

A need exists for preparing higher purity elemental boron more efficiency. A further need exists for preparing elemental boron at lower temperatures and/or with less current density. Moreover, an environmentally friendly process is needed.

SUMMARY OF THE INVENTION

These and other needs are addressed by the various embodiments and configurations of the present invention.

An embodiment of the present invention is a process for recovering elemental boron. The process comprises forming a molten electrolyte and electrolyzing the molten electrolyte to recover elemental boron. The molten electrolyte has a boron-containing compound, at least one alkaline earth fluoride salt and at least two alkali earth fluoride salts. The recovered elemental boron has a purity level of at least about 50%.

Optionally, the molten electrolyte contains a boron-containing compound and a eutectic mixture containing alkali and alkaline earth metal fluorides. In one embodiment, the eutectic mixture is a eutectic composition comprising one of $MgF_2$—$NaMgF_3$—LiF or NaF—$NaMgF_3$—LiF. The eutectic composition $MgF_2$—$NaMgF_3$—LiF has a eutectic point at about 13 mole % NaF, about 61 mole % LiF, and about 26 mole % $MgF_2$. The eutectic composition NaF—$NaMgF_3$—LiF has a eutectic point at about 43 mole % NaF, about 46 mole % LiF, and about 11 mole % $MgF_2$.

In an embodiment, the molten electrolyte is maintained at a homogenizing temperature of at least about 630 degrees Celsius for at least about 0.5 hours before electrolyzing the molten electrolyte. In another embodiment, the molten electrolyte is maintained at a homogenizing temperature of at least about 750 degrees Celsius for at one of about 3, about 6, about 10 or about 24 hours. In yet another embodiment, the molten electrolyte is maintained at a homogenizing temperature of at least about 850 degrees Celsius for about 24 hours. In still yet another embodiment, the molten electrolyte is maintained at a homogenizing temperature is at least about 1,330 degrees Celsius for about 0.5 hour. The homogenization is conducted under a substantially inert atmosphere.

The elemental boron is recovered by electrolyzing the molten electrolyte at a potential from about 1 to about 2 volts. The molten electrolyte is electrolyzed at a temperature of from about 700 to about 775 degrees Celsius.

The at least one alkaline earth fluoride salt is selected from the group of alkaline earth fluorides consisting of beryllium fluoride, magnesium fluoride, calcium fluoride, strontium fluoride, barium fluoride, radium fluoride and mixtures thereof. The at least two alkali earth fluorides are selected from the group of alkali earth fluorides consisting of lithium fluoride, sodium fluoride, potassium fluoride, rubidium fluoride, cesium fluoride, francium fluoride, and mixtures thereof. The boron-containing compound is selected from the group of boron-containing compounds consisting of $B_2O_3$, $NaBF_4$, $NH_4BF_4$, $KBF_4$, $LiBF_4$, $CsBF_4$, boric acid and its salts, sodium borate, lithium borate, potassium borate, cesium borate, and mixtures thereof. Optionally, the boron-containing compound is selected from the group of boron-containing compounds consisting of $B_2O_3$, $NaBF_4$, $NH_4BF_4$, $KBF_4$, $LiBF_4$, and $CsBF_4$ and mixtures thereof.

Other advantages will be apparent to one of ordinary skill in the art from the disclosure provided below. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

One aspect of the present invention is a method for preparing an electrolysis mixture comprising a salt composition and a boron-containing material. Preferably, the salt composition comprises one or both of a molten salt composition and a ternary salt composition. As used herein a molten salt composition means a complex mixture of ion, paired ions and/or complex ions in a molten state. In the molten state, the ions are free to move with little, if any, restriction.

Preferably, the salt composition comprises fluoride salts of at least one alkali earth (NIST periodic table, Group IA) and at least two alkaline earth (NIST periodic table, Group IIA) metals. The alkali metals are selected from the group of metals consisting of lithium, sodium, potassium, rubidium, cesium and francium. The alkaline earth metals are selected from the group of metals consisting of beryllium, magnesium, calcium, strontium, barium and radium. The alkali metals are preferably selected from the group of alkali metals consisting of lithium, sodium and potassium. The alkaline earth metal is preferably magnesium.

In a preferred embodiment, the salt composition comprises magnesium fluoride and two alkali earth fluoride salts selected from the group of lithium fluoride, sodium fluoride, potassium fluoride, rubidium fluoride, cesium fluoride, francium fluoride, and mixtures thereof. In a more preferred embodiment, the salt composition comprises magnesium fluoride and two alkali metal fluorides selected from the group of lithium fluoride, sodium fluoride, potassium fluoride, cesium fluoride, and mixtures thereof.

While not wanting to be bound by any theory, the salt composition comprising magnesium fluoride and at least two alkali metals is believed to have one or both of a low eutectic melt temperature and a high ionic conductivity. The salt composition comprising the alkali metal salts of lithium fluoride and sodium fluoride is expected to have at least of a low eutectic melt temperature and a high ionic conductivity.

Figure 1:
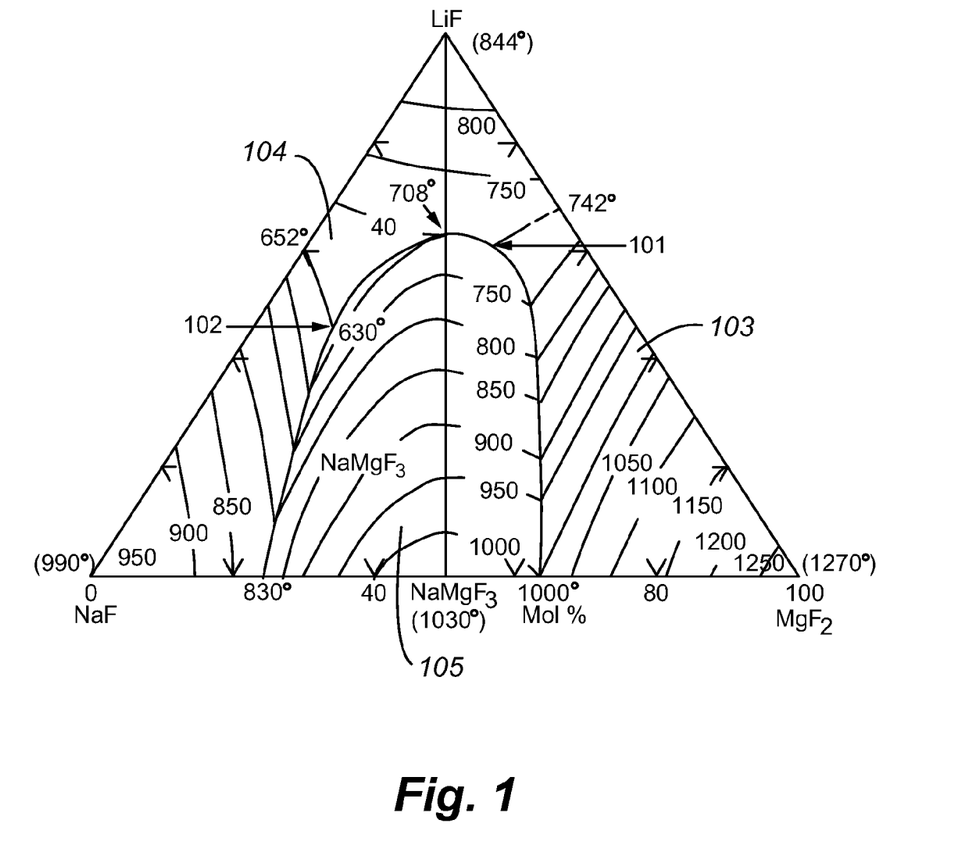
FIG. 1 depicts a composition according to an embodiment of the present invention.

Preferably, the salt composition comprises LiF—NaF—$MgF_2$. FIG. 1 depicts a ternary phase diagram 100 for LiF—NaF—$MgF_2$. The LiF—NaF—$MgF_2$ salt composition has first 101 and second 102 eutectic compositions and first 103 and second 104 compatibility triangles.

The LiF—NaF—$MgF_2$ salt composition comprises an intermediate composition $NaMgF_3$. The LiF—NaF—$MgF_2$ salt composition ternary phase diagram further comprises a $NaMgF_3$ region 105.

The first eutectic composition 101 comprises from about 5 to about 20 mole % NaF, from about 50 to about 70 mole % LiF, and from about 15 to about 35 mole % $MgF_2$. Preferably, the first eutectic composition comprises from about 10 to about 15 mole % NaF, from about 55 to about 65 mole % LiF, and from about 20 to about 35 mole % $MgF_2$. The first eutectic composition 101 more preferably comprises about 13 mole % NaF, about 61 mole % LiF, and about 26 mole % $MgF_2$.

The first eutectic composition 101 has a first eutectic melt temperature from about 685 to about 715 degrees Celsius. In a preferred embodiment, the first eutectic melt temperature is from about 695 to about 705 degrees Celsius. In a more preferred embodiment, the melt temperature of the first eutectic composition is about 700 degrees Celsius.

The first eutectic composition 101 lies within the first compatibility triangle 103. The first eutectic composition 101 comprises substantially $MgF_2$—$NaMgF_3$—LiF. The first eutectic composition 101 solid phase comprises three separate and distinct solid phases: $MgF_2$, $NaMgF_3$, and LiF. Of these three phases, $MgF_2$ has the highest melt temperature. The $MgF_2$ melt temperature is from about 1,250 to about 1,290 degrees Celsius, preferably from about 1,265 to about 1,275 degrees Celsius. The melt temperature of the $MgF_2$ phase is more preferably about 1,270 degrees Celsius.

The second eutectic composition 102 comprises from about 35 to about 55 mole % NaF, from about 35 to about 55 mole % LiF, and from about 1 to about 20 mole % $MgF_2$. The second eutectic composition 102 preferably comprises from about 40 to about 50 mole % NaF, from about 40 to about 50 mole % LiF, and form about 5 to about 15 mole % $MgF_2$. More preferably, the second eutectic composition 102 comprises substantially about 43 mole % NaF, 46 mole % LiF, and about 11 mole % $MgF_2$.

The second eutectic composition 102 has a second eutectic melt temperature from about 615 to about 640 degrees Celsius, preferably from about 625 to about 635 degrees Celsius. More preferably, the second eutectic melt temperature of the second eutectic composition 102 is about 630 degrees Celsius.

The second eutectic composition 102 lies within the second compatibility triangle 104. The second eutectic composition 102 comprises substantially NaF—$NaMgF_3$—LiF. The second eutectic composition 102 comprises three separate and distinct solid phases: NaF, $NaMgF_3$ and LiF. Of these three phases, $NaMgF_3$ has the highest melt temperature. The melt temperature of $NaMgF_3$ is from about 1,010 to about 1,050 degrees Celsius, preferably from about 1,025 to about 1,035 degrees Celsius. The $NaMgF_3$ melt temperature is more preferably about 1,030 degrees Celsius.

While not wanting to be bound by any theory, $NaMgF_3$ is believed to be a binary phase. The binary phase is believed to comprise $NaF.MgF_2$.

The LiF—NaF—$MgF_2$ salt composition, compared to other ternary phase salt compositions, has substantially clear, concise, and simple stability regions. For example, the KF—NaF—$MgF_2$ mixture phase diagram is considered by persons of ordinary skill in the art to be substantially complex compared to the phase diagram of KF—NaF—$MgF_2$. The KF—NaF—$MgF_2$ salt composition phase diagram has three eutectic points and three intermediate compositions. However, the LiF—NaF—$MgF_2$ salt composition is more complex than another salt composition LiF—NaF—KF. The LiF—NaF—$MgF_2$ salt composition having an intermediate compound and two eutectic compositions is more complex than the LiF—NaF—KF, which lacks an intermediate compound and has a single eutectic composition.

The boron-containing material preferably comprises one of $B_2O_3$, an alkali metal and/or alkali earth salt of $BF_4^-$, boric acid or a boric acid salt, a borate, a boron oxide, or boron halide, and mixtures thereof. More preferably, the boron-containing material comprises one or more of $B_2O_3$ and an alkali metal and/or alkali earth salt of $BF_4^-$.

In a preferred embodiment, the electrolysis mixture lacks a phase other than the ternary salt composition and boron-containing material phases. In a more preferred embodiment, the electrolysis mixture contains no more than about 30 wt %, no more than about 25 wt %, no more than about 20 wt %, no more than about 15 wt %, no more than about 10 wt % or no more than about 5 wt % of the boron-containing material. In one preferred embodiment, the electrolysis mixture contains no more than about 4 wt % of the boron-containing material.

Preferably, the salt composition comprising the electrolysis mixture has one or more eutectic compositions. In one embodiment, the electrolysis mixture comprises one of the first 101 and second 102 eutectic compositions of the KF—NaF—$MgF_2$ salt composition and one or more of $B_2O_3$ and an alkali and/or alkaline earth metal salt of $BF_4^-$. Preferably, the electrolysis mixture comprises one of the first 101 and second 102 eutectic compositions and no more than about 40 wt %, no more than about 30 wt %, no more than about 20 wt %, no more than about 10 wt %, or no more than about 5 wt % of the one or more of $B_2O_3$ and an alkali and/or alkaline earth metal salt of $BF_4^-$. In a preferred embodiment, the electrolysis mixture comprises one of the first 101 eutectic compositions and no more than about 20 wt % $B_2O_3$. In another preferred embodiment, the electrolysis mixture comprises one of the second 102 eutectic compositions and no more than about 4 wt % $B_2O_3$.

Figure 2:
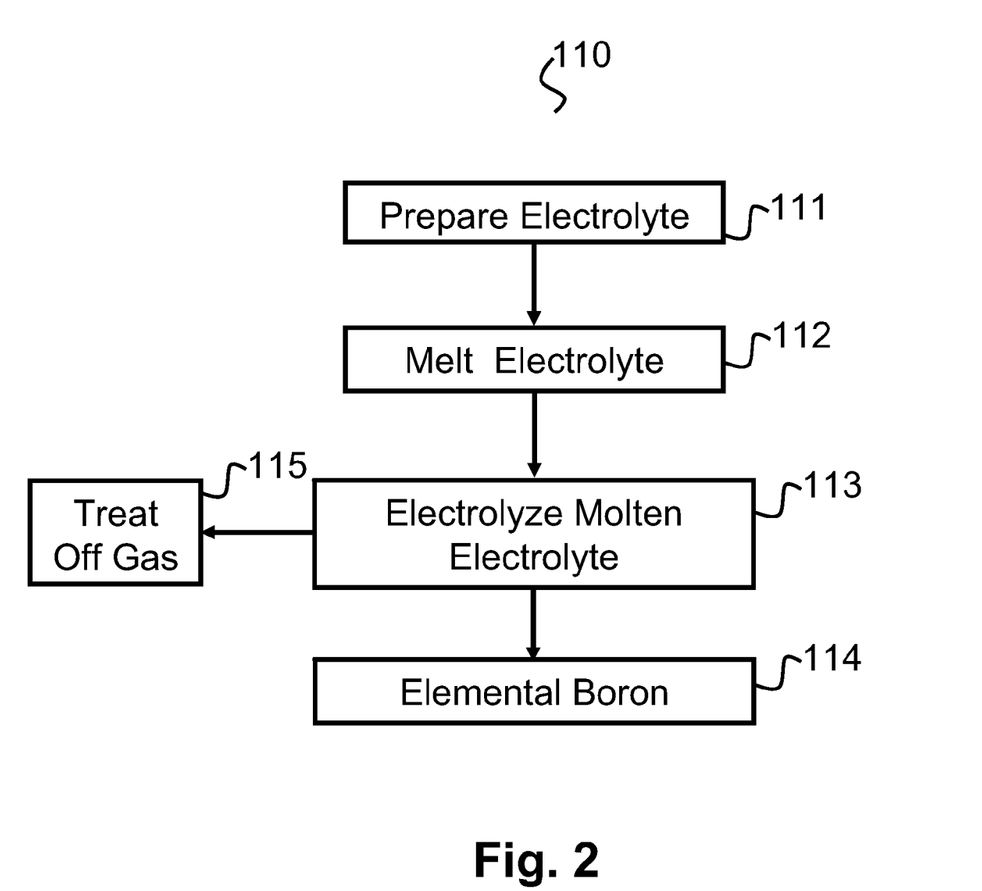
FIG. 2 depicts a process according to an embodiment of the present invention.
Figure 3:
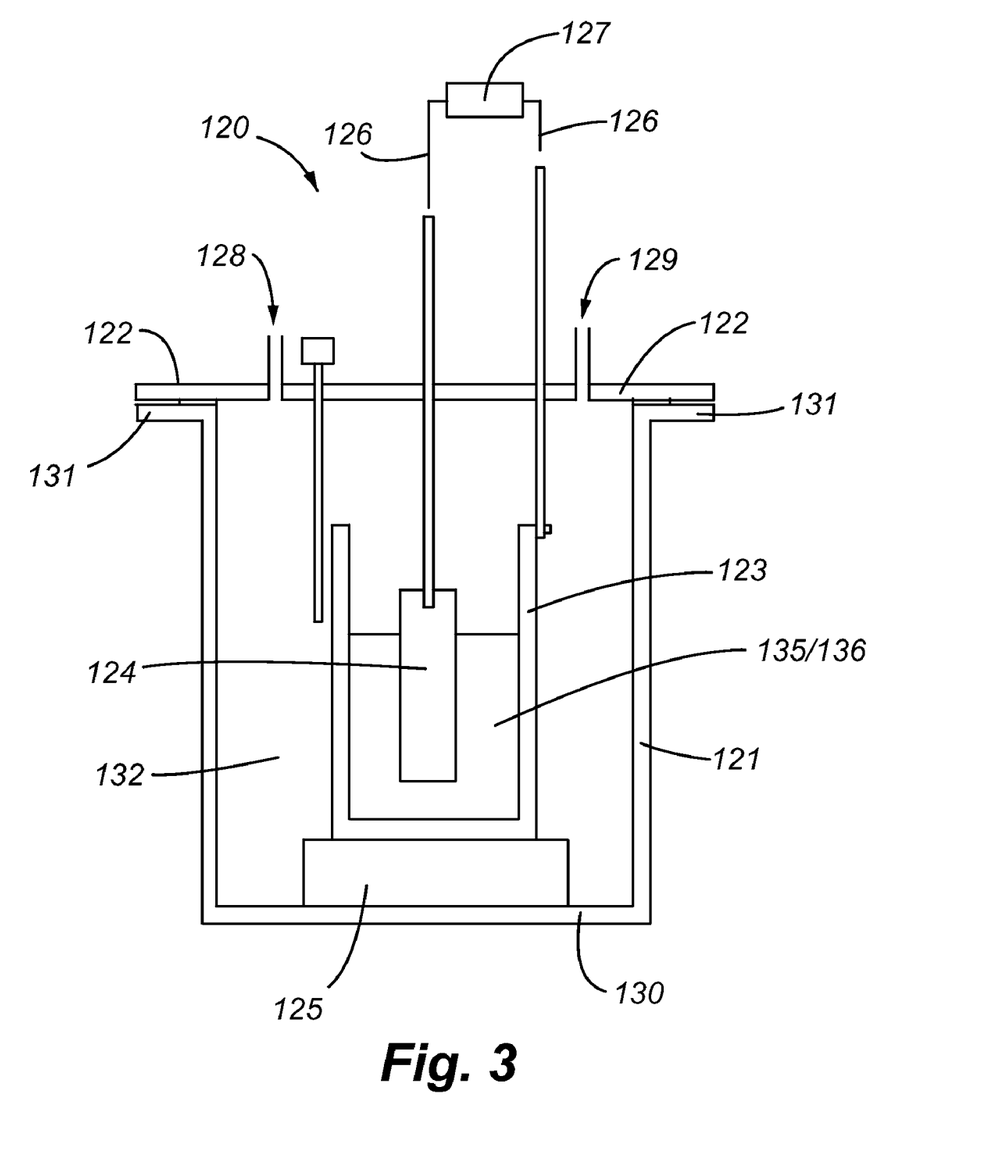
FIG. 3 depicts an apparatus according to an embodiment of the present invention.

FIG. 2 depicts a process for producing elemental boron from the electrolysis mixture. The process is conducted in an electrochemical cell 120 (FIG. 3). The electrochemical cell 120 comprises a cell housing 121, a cell housing cover 122, an anode 123, a cathode 124, an electrical power source 127, an electrical conductor 126, and an optional insulator 125.

The cell housing 121 and housing cover 122 can comprise any material suitable for high temperature service at temperatures exceeding about 350 degrees Celsius. The cell housing 121 has a housing void 132 and a housing wall 131 interconnected to and positioned between a housing top 132 and a housing base 130. The housing top 132 and base 130 are in an opposing relationship. The housing cover 122 can engage the housing 121 to form a substantially airtight seal. Preferably, the cell housing 121 and housing cover 122 comprise a metal alloy, such as, a stainless steel alloy. More preferably, the cell housing 121 and housing cover 122 comprise one of 304 and 316 stainless steels. In one configuration a gasket is positioned between the cell housing 121 and housing cover 122. In another configuration, the housing cover 122 has first 128 and second 129 orifices.

The anode 123, cathode 124, and optional insulator 130 are positioned within the void 132 of the cell housing 121. The anode 123, cathode 124, and optional insulator 130 can comprise any material suitable for high temperature service at temperatures exceeding about 350 degrees Celsius. Furthermore, the anode 123 and cathode 124 are electrically conductive materials.

Suitable anode 123 materials may include, but are not limited to a graphite-containing material, and a high temperature non-oxidizing metal. In a preferred embodiment, the anode 123 comprises a graphite material, more preferably a fine-grained high-density extruded graphite material. The anode 123 can be configured to contain the electrolyte 135 or to be immersed in the electrolyte 135.

Preferably, the anode 123 is electrically insulated from the housing 121. The optional insulator 125 is positioned between the anode 123 and housing 121 when both the anode 123 and housing 121 are substantially electrically conductive. The optional insulator 125 can comprise one of a substantially non-electrically conductive ceramic and/or mineral. Preferably, the optional insulator 125 comprises a substantially non-electrically conductive ceramic. In a preferred embodiment, the optional insulator 125 is positioned between the anode 123 and the housing 121. That is, the optional insulator 125 is positioned between the anode 123 and the housing 121 to prevent the anode 123 from being in electrical contact with the housing 121.

Preferably, the cathode 124 comprises a metal or metallic alloy. More preferably, the cathode 124 comprises one of any steel, mild steel, steel alloy, and any conductive metal or metal alloy. The cathode 124 can be configured to be immersed in or to contain the electrolyte 135. In a preferred embodiment, the cathode 124 is immersed in the electrolyte 135. In configurations having both the anode 123 and cathode 124 immersed in the electrolyte 135, the electrolyte 135 is positioned in an electrolysis container, such as a, crucible.

The anode 123 and the cathode 124 are electrically interconnected to the power source 127 by the electrical connector 126. The electrical connector 126 can be any electrically conductive material, such as without limitation an electrical wire, a conductive metal-containing braid, a metal and/or metal rod. In one configuration, one or both of the housing cell 121 and the housing cover 122 have at least one orifice (not depicted in FIG. 3). The electrical connector 126 is positioned within the at least one orifice to electrically interconnect with the anode 123 and cathode 124. The electrical connector 126 is electrically insulated from the housing 121 and housing cover 122. Optionally, the insulator 125 is positioned within the at least one orifice (not depicted in FIG. 3) to electrically insulate the electrical conductor 126 from one or both of the housing 121 and housing cover 122. It can be appreciated that an electrical circuit is formed by contacting the anode 123 and the cathode 124 with the electrolyte 135 and by electrically interconnecting the anode 123 and cathode 124 with the power source 127 by the electrical connector 126.

The electrical power source 127 can be any electrical power source. Non-limiting examples of suitable electrical power sources are an electrical generator, a battery source, an electrical capacitor, a solar panel, a turbine, or combination thereof.

Returning to the process 110, electrolyte 135 is prepared in step 111. The electrolyte 135 is the electrolysis mixture comprising the salt composition and the boron-containing material. In a preferred embodiment, the electrolyte 135 is positioned within the anode 123. In another embodiment, the electrolyte 135 can be positioned in the electrolysis container. Preferably, the electrolyte 135 is in the form of a powered mixture. More preferably, the electrolyte 135 is the form of a homogenized powdered mixture.

In step 112, energy is applied to the electrolyte 135 to form a molten electrolyte 136. The molten electrolyte 136 forms a molten salt mixture. An energy source (not depicted) supplies the energy. The energy can be in the form of thermal and/or electromagnetic energies. The energy is sufficient to melt the electrolyte 135. In one configuration, a furnace (such as, but not limited to a crucible furnace) provides the energy to melt the electrolyte 135. Preferably, the electrolyte 135 is melted under an argon atmosphere to form the molten electrolyte 136. The molten electrolyte 136 is maintained at a melt temperature for a period of time. The molten electrolyte 136 is sufficiently homogenized by maintaining the molten electrolyte 136 at the melt temperature and for a period of time. Preferably, the melt temperate is greater than about 500 degrees Celsius. More preferably, the melt temperature is greater than one of about 600 degrees, about 650 degrees, about 700 degrees, about 750 degrees, about 800 degrees, about 850 degrees, about 900 degrees, or 1,000 degrees Celsius. In one embodiment, the melt temperature is from about 700 to about 900 degrees Celsius.

In one embodiment, the melt temperature is from about 725 to about 875 degrees Celsius. In a preferred embodiment, the melt temperature is from about 750 to about 850 degrees Celsius. In a more preferred embodiment, the melt temperature is one of about 750 or 850 degrees Celsius.

The period of time the molten electrolyte 136 is maintained at the melt temperature is more about 0.5 hour or more, preferably the period of time is about 1 hour or more, is about 2 hrs or more, is about 3 hours or more, is about 4 hours or more, is about 5 hrs or more, is about 6 hrs or more, is about 7 hrs or more, is about 8 hours or more, is about 9 hours or more, is about 10 hours or more, is about 12 hours or more, is about 24 hours or more, and is about 48 hours or more. Even more preferably, the period of time is one of about 3 hours, about 6 hours, about 10 hours, 24 hours, and 48 hours.

In one configuration, the molten electrolyte 136 is homogenized at the melt temperature of about 750 degrees Celsius for the period of time of one of about 3 hours, about 6 hours, about 10 hours and about 24 hours. In another configuration, the molten electrolyte 136 is homogenized at the melt temperature of about 850 degrees Celsius for about 24 hours.

Preferably, the electrolyte 135 is melted in an atmosphere depleted at least mostly, if not substantially completely, of an oxidizing gas, such as oxygen. More preferably, the atmosphere comprises at mostly, if not substantially completely, a gas selected from a group of inert gases consisting of argon, nitrogen, helium, neon, krypton, neon, radon, and a mixture thereof. Even more preferably, the atmosphere comprises at least mostly, if not substantially completely, one of argon, nitrogen, or a mixture thereof. The inert gas is introduced to the electrochemical cell 120 through the first orifice 128 and removed from the electrochemical cell 120 through the orifice 129. Preferably, the gas is continually supplied to the electrochemical cell 120 during the melting of the electrolyte 135 and homogenization of the molten electrolyte 136. Substantially enough inert gas is introduced into the electrochemical cell 120 to prevent at least some, if not all, of one or both of the anode 123 and the elemental boron from oxidizing during the process 100.

Table I contains homogenization data for an electrolysis mixture comprising $B_2O_3$ and the first eutectic composition 101. The data are non-limiting examples and are not to be construed to limit disclosure and/or metes and bounds of the claims. Table I contains data for the electrolysis mixture mass (in grams) after melting at about 750 degrees Celsius for three hours.

TABLE I

| Wt. % $B_2O_3$ | $W_i$ | $W_f$ | $W_{loss}$ | Wt. % loss | $W_i$ $B_2O_3$ | Wt. % loss of $B_2O_3$ |
|---|---|---|---|---|---|---|
| 0 | 3.0029 | 3.0029 | 0.0000 | 0.0 | | |
| 5.15 | 3.1530 | 3.1138 | 0.0392 | 1.2 | 0.1630 | 24.0 |
| 10.05 | 2.6139 | 2.5437 | 0.0702 | 2.7 | 0.2627 | 26.7 |
| 13.7 | 2.8016 | 2.6995 | 0.1021 | 3.6 | 0.3838 | 26.6 |
| 15.01 | 2.6336 | 2.5291 | 0.1045 | 4.0 | 0.3953 | 26.4 |
| 20.7 | 3.7346 | 3.5929 | 0.1417 | 3.8 | 0.7545 | 18.8 |
| 25.01 | 2.7435 | 2.6123 | 0.1312 | 4.8 | 0.6861 | 19.1 |
| 100 | 5.2558 | 4.0603 | 1.1955 | 22.7 | 5.2558 | 22.7 |

$W_i$: initial mass; $W_f$: final mass; $W_{loss}$: mass loss

While not wanting to be limited by theory, it is believed that at least some of the boron-containing material, $B_2O_3$, is lost during the homogenization process by vaporization of the boron-containing material. $W_i$ is the initial mass of the electrolysis mixture (or $B_2O_3$ for the 100 wt % $B_2O_3$ sample) prior to the application of heat. $W_f$ is the mass of the electrolysis mixture (or 100 wt % $B_2O_3$ sample) after being heated at about 750 degrees Celsius for about 3 hours. $W_{loss}$ is difference in mass between $W_i$ and $W_f$ that is $W_{loss}=W_i-W_f$. The data show the samples containing $B_2O_3$ lost mass when heated, whereas samples lacking $B_2O_3$ fail to lose mass when heated during the homogenization process. The mass loss is believed to be due to vaporization one or both of water and $B_2O_3$. The water is believed to be associated with the $B_2O_3$ sample. While, the $B_2O_3$ has a lower vapor pressure than the other components comprising the first eutectic composition 101, it is believed $B_2O_3$ activity increases in the first eutectic composition 101.

In step 113, the molten electrolyte 136 is electrolyzed to form elemental boron 114. After the homogenization period, the molten electrolyte 136 is adjusted to an electrolysis temperature. The electrolysis temperature is any temperature at or above the melt temperature of the electrolyte 135. Preferably, the electrolysis temperature is from about 500 to about 1,000 degrees Celsius. More preferably, the electrolysis temperature is from about 600 to about 900 degrees Celsius. Even more preferably, the electrolysis temperature is from about 700 to about 800 degrees Celsius. The cathode 124 is positioned within the molten electrolyte 136. Preferably, the cathode 124 is positioned to be substantially about equidistance from the anode sides. That is, the cathode 124 is substantially centered within the molten electrolyte 136.

The inert gas introduced into the electrochemical cell 120 during the melting of the electrolyte 135 can also be used to purge the electrochemical cell 120 during the electrolyzing of the melted electrolyte 126. The inert gas purge is used preferably to remove one or more off-gases produced during electrolysis from the electrochemical cell 120. The one or more off-gasses are swept from the electrochemical cell 120 by the inert purge gas and removed from the electrochemical cell 120 through the orifice 129. After exiting the electrochemical cell 120, the one or more off-gasses pass through and are treated by a series of traps (not shown), in step 115. The series of traps remove any fluorine ($F_2$) and/or other compounds (such as, $BF_3$) comprising the one or more off gasses. Examples of suitable off-gas traps comprise: magnesium oxide (MgO) pellets for removing fluorine and boron containing-containing species, anhydrous calcium sulfate ($CaSO_4$) for removing water, a sodium hydroxide (NaOH) scrubber for removing acid fumes and absorb any other volatile compounds, and a reflux-trap to avoid back-flushing within the series of traps.

The electrical power source 127 provides an electrical potential between the anode 123 and the cathode 124. The electrical potential is from about 0.2 to about 10 volts. Preferably, the electrical potential between the anode 123 and the cathode 124 is from about 0.5 to about 5 volts. More preferably, the electrical potential between the anode 123 and the cathode 124 is from about 1.3 to about 4.5 volts. In molten salts, the use of a reference electrode is limited and rather troublesome. For this reason, the electrical potential voltages between the anode 123 and the cathode 124 used herein are reported without respect to a reference electrode.

The electrical potential can be applied for any period of time. Preferably, the period of time the electrical potential is applied is sufficient to form at least some elemental boron 114 on the cathode 124. More preferably, the period of time the electrical potential is applied is sufficient to deposit at least some, if not most, of the boron contained within the molten electrolyte 136 as elemental boron 114 on the cathode 124. While not wanting to be limited by example, the electric potential is applied for a period of time of less than one of about 60 hours, less than 48 hours, less than about 42 hours, less than 36 hours, less than about 30 hours, less than about 24 hours, less than about 18 hours, less than about 12 hours, and less than about 6 hours. In a preferred embodiment, the electrical potential is applied from about 12 hours to about 48 hours. Preferably, at least about 25 wt % of the boron-containing material in the molten electrolyte 136 is electrochemically recovered as elemental boron 114, more preferably at least about 75 wt % of the boron-containing material is recovered as elemental boron 114. Even more preferably, at least about 90 wt % of the boron-containing material in the molten electrolyte 136 is recovered as elemental boron 114. Still even more preferably, at least about 97 wt % of the boron-containing material is recovered as elemental boron 114 from the molten electrolyte 136.

In a preferred embodiment, the purity level of the elemental boron 114 electrodeposited on the cathode 124 has a purity level of at least about 40%, more preferred at least about 60%. In an even more preferred embodiment, the purity level of the element boron 114 electrodeposited on the cathode 124 has a purity level of at least about 80%, yet even more preferred the purity level is at least about 90%. In still yet an even more preferred embodiment, the purity level of the elemental boron 114 recovered on the cathode 124 by electrodepositing is at least about 97%.

Figure 4:
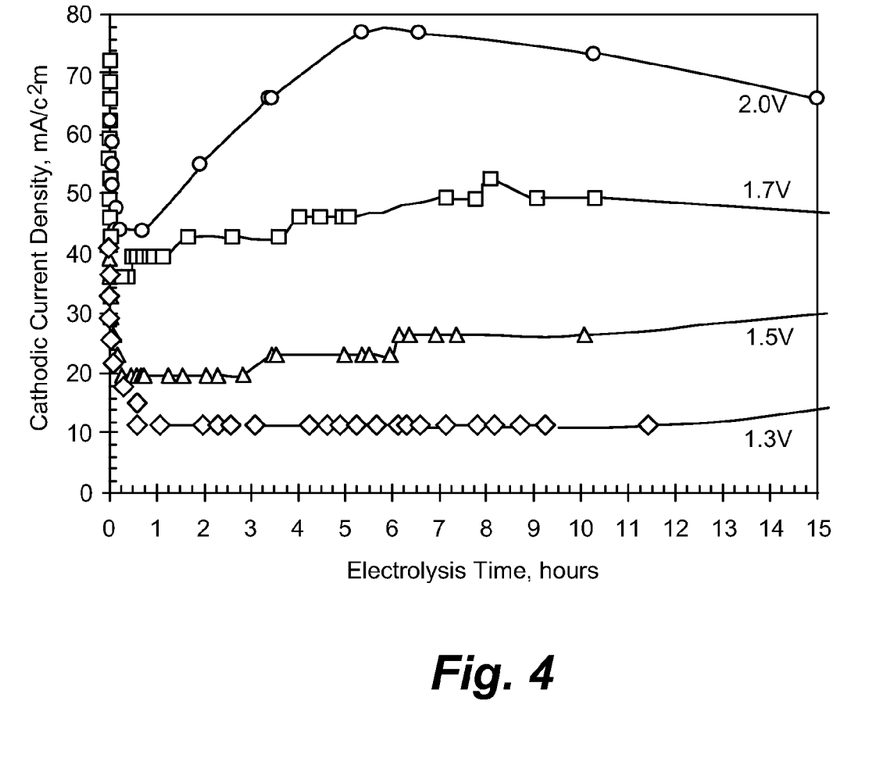
FIG. 4 depicts an effect of electrical potential on boron recovery and purity according to an embodiment of the present invention.

FIG. 4 depicts a non-limiting example of the effect of the applied electrical potential on the recovery and purity levels for elemental boron 114 from the electrolysis of the molten electrolyte 136 comprising about 5 wt % $B_2O_3$ and second eutectic composition 102 at the electrolysis temperature of about 700 degrees Celsius. Optionally, higher elemental boron purity levels can be achieved for lower applied electrical potentials.

In another embodiment, greater recoveries of the boron-containing material in the molten electrolyte 136 can be achieved at higher applied electrical potentials. While not wanting to be limited by example, Table II summaries the purity levels and recoveries for the electrolysis of the molten electrolyte 136 comprising about 5 wt % $B_2O_3$ and second eutectic composition 102 at differing electrolysis temperatures, electrolysis temporal durations, applied electrical potentials and homogenization conditions.

TABLE II

| Electrolysis Voltage (° C./V) | Electrolysis Temperature (° C.) | Homogenization Time (hours) | Elect. Temp. (° C.) | Cell Potential (V) | Electrolysis Time (hours) | Grade wt. % | Recovery wt. % |
|---|---|---|---|---|---|---|---|
| 1.3 | 750 | 10 | 750 | 1.3 | 30 | 78.98 | 0.43 |
| 2 | 750 | 10 | 750 | 2.0 | 24.5 | 37.38 | 64.10♦ |
| 1.7 | 750 | 10 | 750 | 1.7 | 32.5 | 31.18 | 77.09♦ |
| 1.5 | 750 | 10 | 750 | 1.5 | 35.8 | 38.78 | 44.83 |
| 2 | 700 | 10 | 700 | 2.0 | 28.5 | 60.71 | 87.31♦ |
| 1.5 | 700 | 10 | 700 | 1.5 | 50 | 88.36 | 31.05 |
| 2 | 775 | 10 | 775 | 2.0 | 24.6 | 37.24 | 73.92♦ |
| 1.5 | 775 | 10 | 775 | 1.5 | 35 | 36.06 | 33.40 |
| 1.3 | 750 | 24 | 750 | 1.3 | 51 | 77.69 | 8.84 |
| 2 | 700 | 0.5 | 700 | 2.0 | 21 | 55.05* | 91.70♦ |

Homogenization temperature was 750° C. for all experiments but 1330° C. for EB20.
Elect. Temp: Electrolysis temperature, hrs: hours.
*Value from ICP analysis in simple diluted 500x with 5 vol. % HCl.
♦Close to 100% depletion of boron source.

Figure 5:
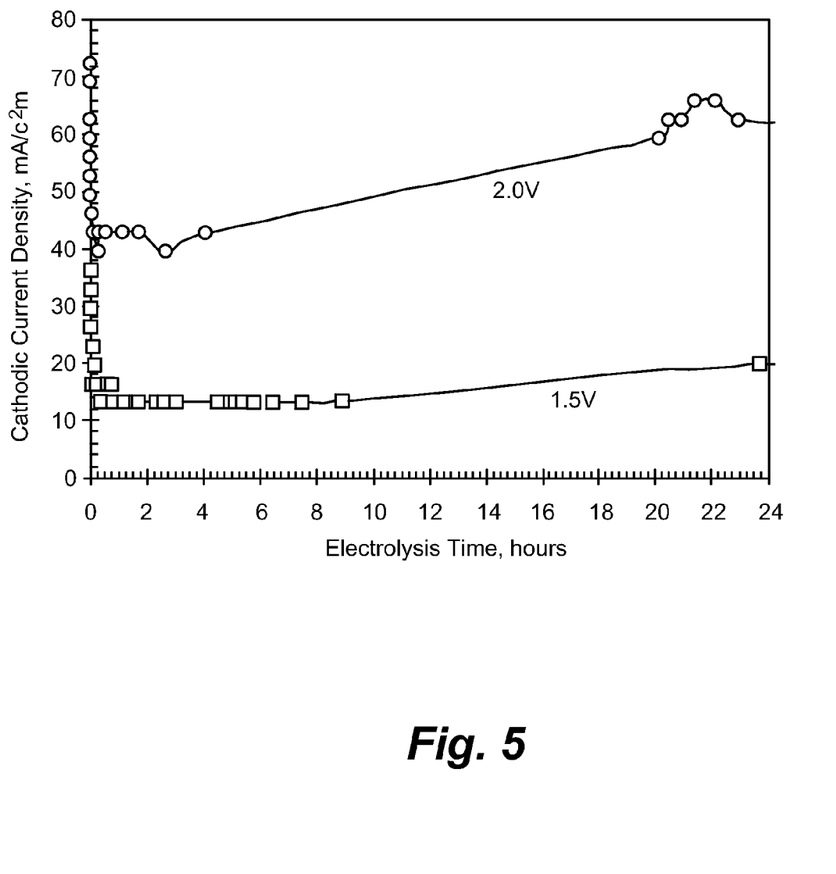
FIG. 5 depicts the effect of cell potential on cathodic current density as a function of electrolysis time at an electrolysis temperature of 750 degrees Celsius according to an embodiment of the present invention.
Figure 6:
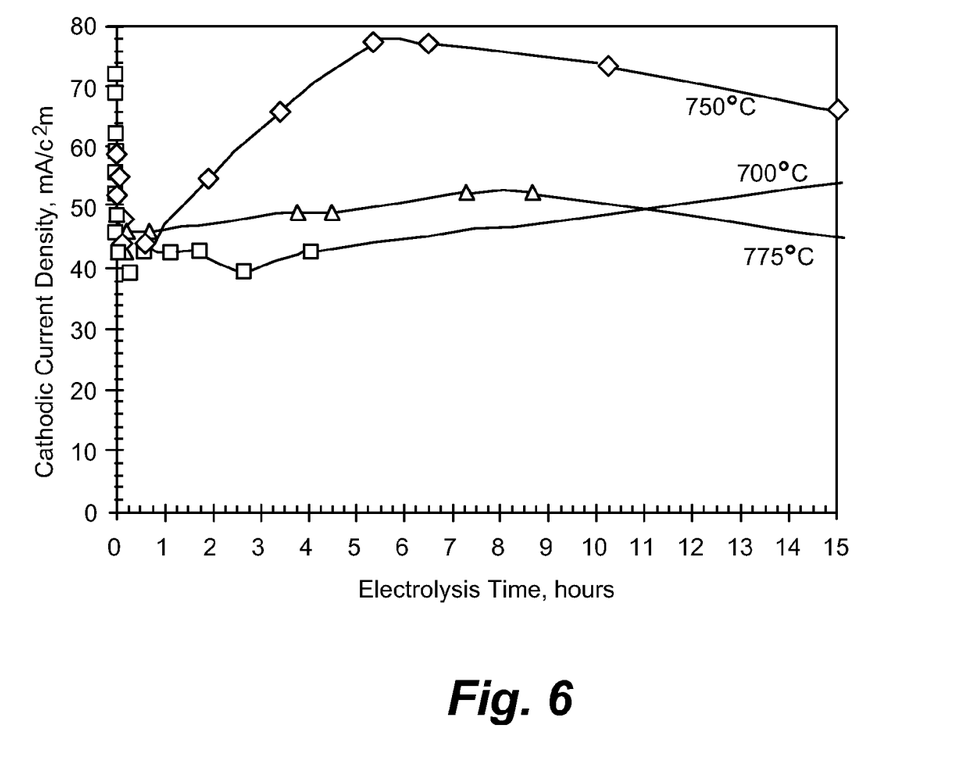
FIG. 6 depicts an effect of cell potential on cathodic current density as a function of electrolysis time at an electrolysis temperature of 700 degrees Celsius according to an embodiment of the present invention.

FIGS. 5 and 6 are non-limiting examples of the effect of the electrical potential on cathodic current density at about 750 and about 700 degrees Celsius for the molten electrolyte 136 comprising about 5 wt % $B_2O_3$ and second eutectic composition 102. The data show increases in the electrical potential increase the cathodic current density.

The electrolysis is conducted at a cathodic current density from about 0.1 to about 120 mA/cm$^2$, preferably from about 1 to about 100 mA/cm². More preferably, the cathodic current density is from about 10 to about 75 mA/cm², even more preferably from about 20 to 75 mA/cm².

Regarding the electrolysis at about 750 degrees Celsius (FIG. 5), the electrical potentials of about 1.3 V, about 1.5 V, and about 1.7 V exhibit similar behavior. Each of these potentials has an initially high cathodic current density, which decreases and stabilizes after a short period of time. The electrical potential of the about 2.0 V potential has different cathodic current density behavior than the electrical potentials of about 1.3 V, of about 1.5 V, and of about 1.7 V. The differing behavior of the about 2.0 V electrical potential is believed to be due the rapid depletion of boron species near the cathode 124 at the high electrical potential and the resulting control of the boron deposition process by the boron-containing material diffusion rate to the cathode 124.

Figure 7:
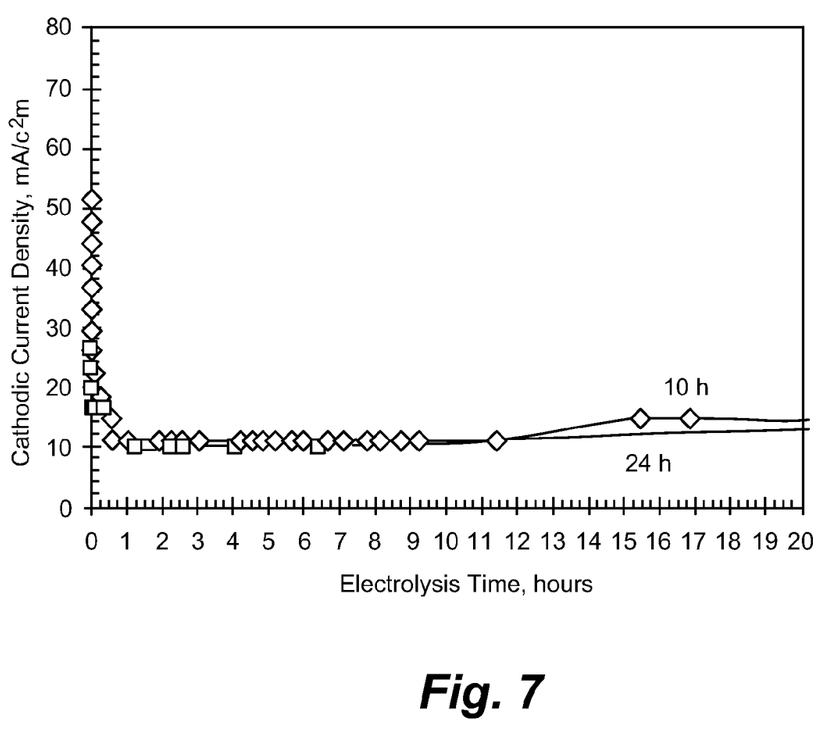
FIG. 7 depicts an effect of electrolysis temperature on cathodic current density as a function of electrolysis time according to an embodiment of the present invention.

FIG. 7 shows a non-limiting effect of the electrolysis temperature on the cathodic current density at the applied electrical potential of about 2.0 V for the molten electrolyte 136 comprising about 5 wt % $B_2O_3$ and second eutectic composition 102. Each current density curve defines an area under the curve. The area under the current density curve represents a quantity of electrons consumed during the electrolysis. The area under the 750 degree Celsius curve is greater than the areas under either of the about 700 or about 775 degree Celsius curves. Electrolysis conducted at about 750 degrees Celsius has a greater degree of electrochemical activity than either the about 700 or about 775 degree Celsius. More specifically, the greater number electrons consumed at about 750 degrees Celsius represents a greater amount of elemental boron 114 produced at about 750 degrees Celsius than either at about 700 or about 775 degrees Celsius.

Figure 8:
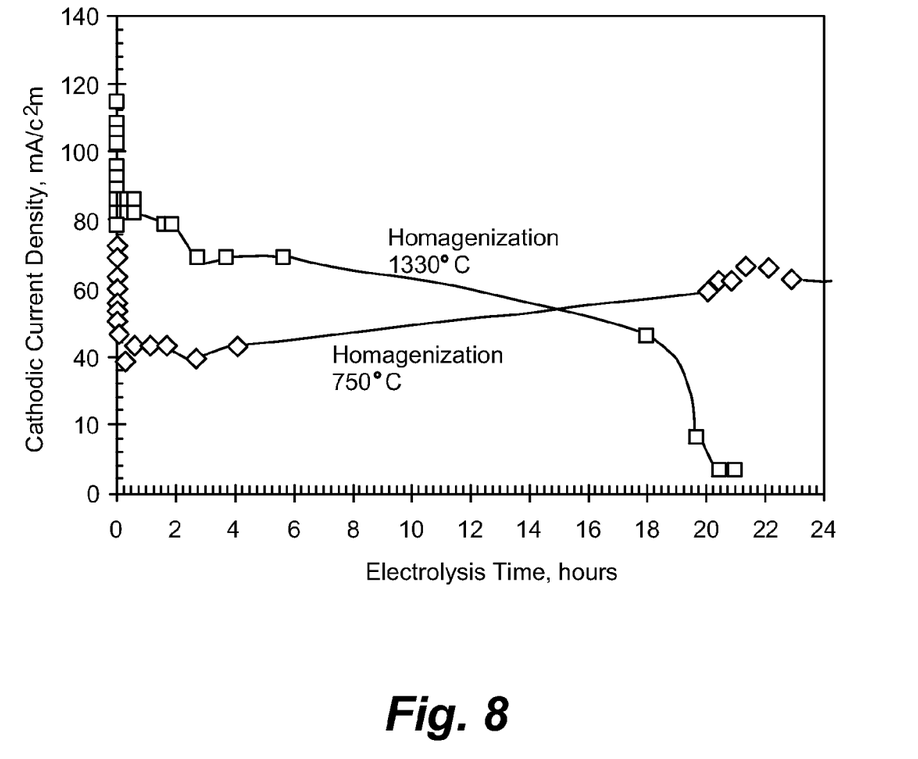
FIG. 8 depicts an effect of homogenization temperature on cathodic current density as a function of electrolysis time according to an embodiment of the present invention.
Figure 9:
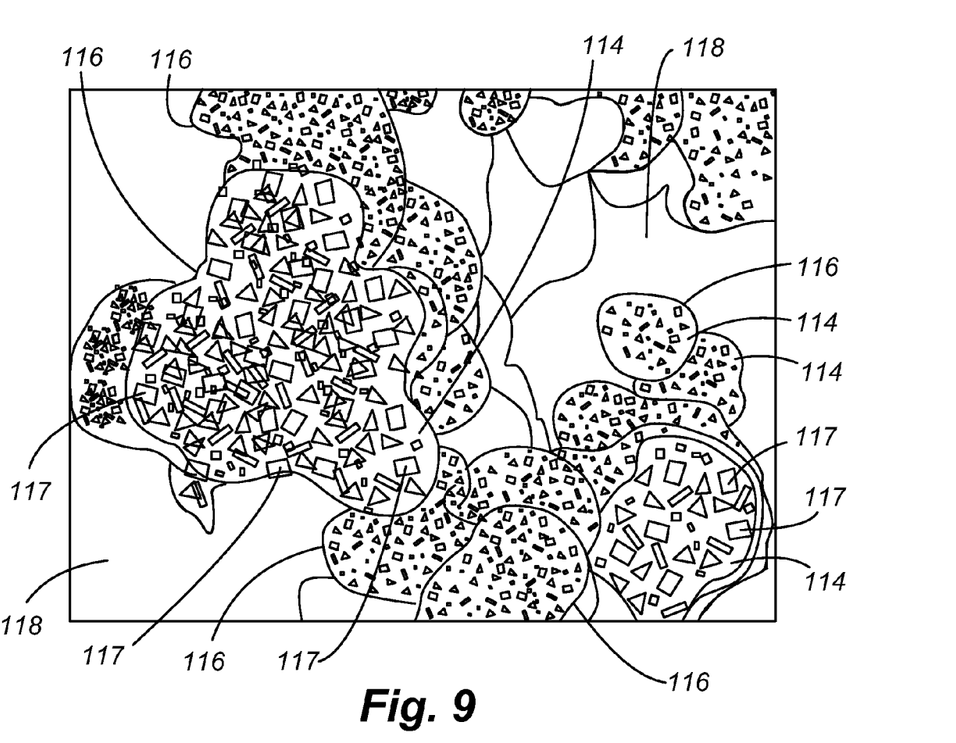
FIG. 9 depicts an effect of homogenization time on cathodic current density as a function of electrolysis time according to an embodiment of the present invention.

FIGS. 8 and 9 depict non-limiting examples of the effect of homogenization time and temperature on the cathodic current density. FIG. 8 shows the effect of homogenization time at the homogenization temperature of about 750 degrees Celsius on the cathodic current for the molten electrolyte 136 comprising about 5 wt % $B_2O_3$ and second eutectic composition 102. The cathodic current density was determined at the applied electrical potential of about 1.3 V. Under the indicated test conditions the differing homogenization time periods of about 10 and about 24 hours had little, if any, affect on the cathodic current density.

FIG. 9 shows the effect of homogenization temperature on the cathodic current for the molten electrolyte 136 comprising about 5 wt % $B_2O_3$ and second eutectic composition 102. The homogenization temperatures were at about 750 and about 1,330 degrees Celsius. The about 1,330 degree Celsius homogenization temperature had an initial higher cathodic current density than the about 750 degree Celsius homogenization temperature. It is believed, that the higher homogenization temperature at about 1,330 degree Celsius provided a more completely molten and dissolved electrolyte 136. Furthermore, it is believed the more completely molten electrolyte 136 formed at the higher homogenization temperature (at about 1,330 degrees Celsius) has a greater degree of conductivity than the molten electrolyte 136 formed at the lower homogenization temperature (of about 750 degrees Celsius).

While not wanting to be limited by example, Table III summaries the electrolysis efficiency for the production the elemental boron 114 from the molten electrolyte 136 comprising about 5 wt % $B_2O_3$ and second eutectic composition 102 having about 49 wt % NaF, 33 wt % LiF and about 18 wt % $MgF_2$. The electrolysis efficiency was calculated according to Faraday's Law. The electrolysis efficiency is a measure of the theoretical

TABLE III

| Electrolysis Voltage (°C./V) | Electrolysis Temperature (°C.) | Boron Produced, g | Theoretical Charge Needed, C | Actual Charge Consumed, C | Current Efficiency, % | kWh/kg Boron |
|---|---|---|---|---|---|---|
| 2 | 750 | 1.6000 | 42,849 | 100,356 | 42.70 | 35 |
| 1.7 | 750 | 1.8897 | 50,608 | 148,660 | 34.04 | 37 |
| 1.5 | 750 | 1.1189 | 29,965 | 118,884 | 25.21 | 44 |
| 2 | 700 | 2.1572 | 57,771 | 165,474 | 34.91 | 43 |
| 1.5 | 700 | 0.7757 | 20,774 | 98,782 | 21.03 | 53 |
| 2 | 775 | 1.8451 | 49,413 | 121,115 | 40.80 | 36 |
| 7.5 | 775 | 0.8351 | 22,365 | 110,522 | 20.24 | 55 |
| 2 | 700 | 2.4649 | 66,012 | 131,064 | 50.37 | 30 | charge required to deposit the elemental boron 114 produced in each experiment. Actual charge consumed for each electrolysis run was determined from current versus time plots for the experiment. The actual charge consumed is area under the charge versus time curve. The current efficiency is the actual charge consumed to the theoretical charge required ratio. The current efficiencies for the bench top studies were about 20% to about 50%. The current efficiencies are non-limiting examples. One of ordinary skill in the art would be able to produce elemental boron 114 by the method and process of the present invention with current efficiencies of greater than about 50%. Table II includes electrolytic energy consumed per kilogram of the elemental boron 114 produced was calculated using the following equation:

$$\text{kWh/kg}(B^0) = (\text{charge consumed} \times \text{potential})/(\text{mass of } B^0 \text{ produced} \times 3.6 \times 10^6) \quad (2)$$

Figure 10:
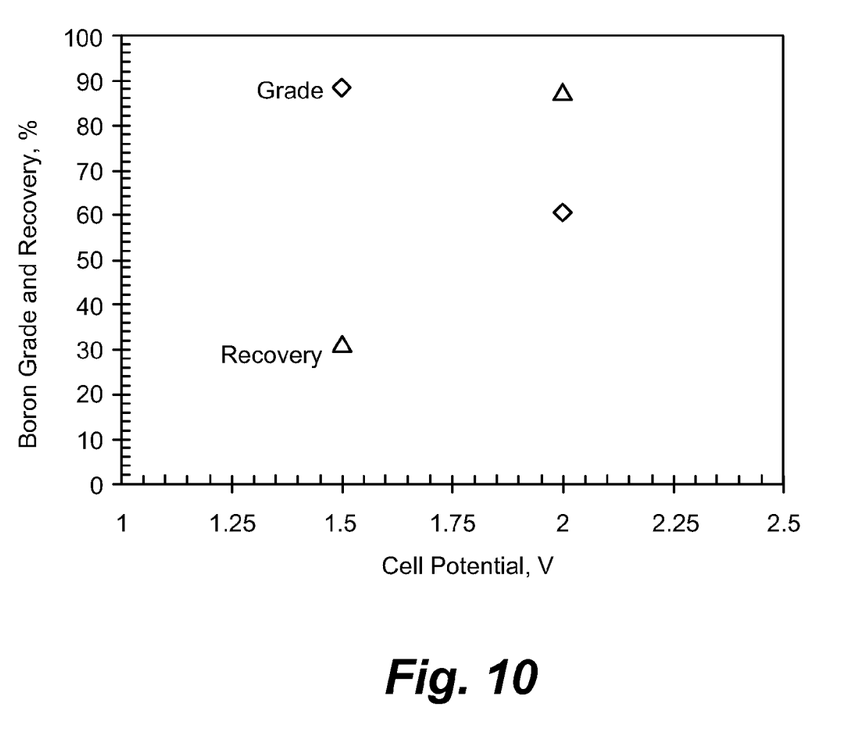
FIG. 10 depicts a micrograph of a cathode deposit formed according to an embodiment of the present invention.

FIG. 10 depicts a micrograph of the elemental boron 114 deposited on cathode 124 from the molten electrolyte 136 having about 5 wt % $B_2O_3$ and second eutectic composition 102. The molten electrolyte 136 was homogenized for 30 minutes at 1,330 C before being electrolyzed at the electrolysis temperature of about 750 degrees Celsius and the electrical potential of about 2 V. The electrodeposited element boron 114 comprises a plurality of particles 116 of elemental boron. The particles 116 of elemental boron have a crystalline-like, nanometric coating 117 dispersed over the particle surface. The crystalline-like, nanometric coating 117 can vary in form, structure or both. The nanometric coating 117 grain size varies from fine and/or small to coarse and/or large. The particles 116 are typically electrochemically deposited as an agglomeration of particles.

The particles 116 have a volume substantially containing elemental boron. The particle volume comprises at least about 60 wt % elemental boron, at least about 70 wt % elemental boron, at least about 80 wt % elemental boron, at least about 85 wt % elemental boron, at least about 90 wt % elemental boron, at least about 95 wt % elemental boron or at least about 98 wt % elemental boron.

The particle volume can further contain one or more non-elemental boron entities. The one or more non-elemental boron entities can comprise less than about 40 wt %, less than about 30 wt %, less than about 20 wt %, less than about 15 wt %, less than about 10 wt %, less than about wt 5%, or less than about 2 wt % of the particle 116.

The one or more non-elemental boron entities can comprise one or both of silicon and phosphorous. It is believed that the silicon and phosphorous come from the metal containing cathode 124. Further regarding the metal containing cathode 124, it was found that elemental boron can diffuse into the cathode 124. The diffusion of the elemental boron into the metal cathode 124 can harden the cathode surface.

The particles 116 can have a shape generally resembling a spherical shape. The particles 116 produced can vary greatly in size. Preferably, the particles 116 have an average particle size from about 0.01 to about 100 µm. More preferably, the particles 116 have average particle size from about 0.1 to about 10 µm, even more preferably form about 0.5 to about 5 µm.

The energy supplied to maintain the electrolyte in a molten state and the electrical power supplied to the electrochemical cell 120 are stopped before the elemental boron 114 is removed from the cathode 124. Preferably, the cathode containing the elemental boron 114 is cooled in an atmosphere substantially comprising at least mostly, if not entirely, an inert gas. Typically, the elemental boron 114 is removed from the cathode 124 by a mechanical method, such as, but not limited to hammering, chiseling, grinding, impacting, abrading, or combinations thereof. In other configurations, the elemental boron 114 can be by a chemical method, such as, physically dissolving and/or dispersing the boron in a solvent or by removed from the cathode 124 by a chemical reaction (such as, reacting the elemental boron 114 to form a boron containing compound). In yet another configuration, the elemental boron 114 can be processed, such as, by electrorefining to further purity the boron.

Typically, the electrodeposited elemental boron 114 (particles 116 in FIG. 10) contained an incrusted electrolyte-containing composition 118 (see, FIG. 10). The incrusted electrolyte-containing composition 118 comprises one or more of $NaMgF_3$, LiF, NaF, $MgF_2$ and MgO. The incrusted electrolyte-containing composition 118 is typically crystalline in nature and has an x-ray diffraction pattern. The elemental boron 114 typically lacks an x-ray diffraction pattern and is substantially amorphous in nature.

$MgF_2$ was as the main impurity in the elemental boron 114 produced from the first eutectic composition 101. Elemental boron 114 produced from the second eutectic composition 102 had little, if any, $MgF_2$ contained with the electrochemically produced elemental boron 114.

$MgF_2$ is typically deposited between agglomerated particles 116. While not wanting to be bound by any theory, less $MgF_2$ is present in elemental boron 114 produced from the second 102, compared to the first 101, eutectic composition 102, due to the second eutectic composition 102 location within the LiF—$NaMgF_3$—NaF stability triangle region. More specifically, $MgF_2$ is substantially absent in the LiF—$NaMgF_3$—NaF stability triangle region due to the presence of the binary NaF—$MgF_2$, that is $NaMgF_3$ neighborite phase. Moreover, homogenizing the melted electrolyte 136 at about 1330 degrees Celsius can substantially reduce $MgF_2$ content within the electrochemically produced elemental boron 114. The melting point of $MgF_2$ is about 1270 degrees Celsius. $MgF_2$ has the highest melting temperature ($T_{melting}$ of $MgF_2$ is 1270 degrees Celsius) of the components comprising the electrolyte 135. It is believed that homogenizing the molten electrolyte 136 at about 1330 degrees Celsius substantially assures all components of the molten electrolyte 136 are completely liquid during the electrolysis.

EXAMPLES

Example I

Preparation of the Electrolyte

Each electrolyte composition was prepared by mixing magnesium fluoride ($MgF_2$), lithium fluoride (LiF), sodium fluoride (NaF), and boron oxide ($B_2O_3$) powders in a ceramic ball mill with alumina grinding media for an hour to form an electrolyte mixture. The magnesium fluoride, lithium fluoride and boron oxide were procured from Alfa Aesar™ and the sodium fluoride was obtained from Fisher™. The levels of purity of the $MgF_2$, LiF, NaF and $B_2O_3$, respectively, were 99.5%, 98.5%, 98% and 99%. The electrolyte mixture was dried for more than 12 hours under an argon atmosphere inside the electrochemical cell or in a muffle furnace in an air atmosphere.

The present invention, in various embodiments, includes components, methods, processes, systems and/or apparatus substantially as depicted and described herein, including various embodiments, subcombinations, and subsets thereof. Those skilled in the art will appreciate how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for recovering boron from a boron-containing material, comprising the steps of:
    a) forming a molten electrolyte comprising a boron-containing compound and an eutectic mixture comprising one of $MgF_2$—$NaMgF_3$—$LiF$ or $NaF$—$NaMgF_3$—$LiF$; and
    b) recovering elemental boron by electrolyzing said molten electrolyte, wherein said boron-containing compound is selected from the group of boron-containing compounds consisting of $B_2O_3$, $NaBF_4$, $NH_4BF_4$, $KBF_4$, $LiBF_4$, $CsBF_4$, boric acid and its salts, sodium borate, lithium borate, potassium borate, cesium borate, and mixtures thereof.

2. The process of claim 1, wherein said boron-containing compound is selected from the group of boron-containing compounds consisting of $B_2O_3$, $NaBF_4$, $KBF_4$, $LiBF_4$, $CsBF_4$ and mixtures thereof.

3. The process of claim 1, further comprising maintaining said molten electrolyte at a homogenizing temperature of at least about 500 degrees Celsius for at least about 0.5 hours under a substantially inert atmosphere before recovering step b).

4. The process of claim 1, wherein said recovering step b) further comprises electrolyzing said molten electrolyte at a potential from about 1 to about 2 volts and wherein the molten electrolyte has an electrolyzing temperature of from about 700 to about 775 degrees Celsius.

5. The process of claim 1, wherein said recovered elemental boron has a purity level of at least about 50%.

6. The process of claim 1, wherein said recovered elemental boron has a purity level of at least about 50%.

7. A process for recovering boron from a boron-containing material, comprising the steps of:
    a) forming a molten electrolyte comprising a boron-containing compound and a eutectic mixture comprising one of $MgF_2$—$NaMgF_3$—$LiF$ or $NaF$—$NaMgF_3$—$LiF$; and
    b) recovering elemental boron by electrolyzing said molten electrolyte.

8. The process of claim 7, wherein said eutectic composition $MgF_2$—$NaMgF_3$—$LiF$ has a eutectic point at about 13 mole % NaF, about 61 mole % LiF, and about 26 mole % $MgF_2$.

9. The process of claim 7, wherein said eutectic composition $NaF$—$NaMgF_3$—$LiF$ has a eutectic point at about 43 mole % NaF, 46 mole % LiF, and 11 mole % $MgF_2$.

10. The process of claim 9, further comprising maintaining said molten electrolyte at a homogenizing temperature of at least about 1330 degrees Celsius for about 0.5 hour under a substantially inert atmosphere before recovering step b).

11. The process of claim 7, wherein said boron-containing compound is selected from the group of boron-containing compounds consisting of $B_2O_3$, $NaBF_4$, $NH_4BF_4$, $KBF_4$, $LiBF_4$, and $CsBF_4$ and mixtures thereof.

12. The process of claim 7, further comprising maintaining said molten electrolyte at a homogenizing temperature of at least about 750 degrees Celsius for at one of about 3, about 6, about 10 or about 24 hours under a substantially inert atmosphere before recovering step b).

13. The process of claim 7, further comprising maintaining said molten electrolyte at a temperature of at least about 850 degrees Celsius for about 24 hours under a substantially inert atmosphere before recovering step b).

14. The process of claim 7, wherein said recovering step b) further comprises electrolyzing said molten electrolyte at a potential from about 1 to about 2 volts and wherein the molten electrolyte has a temperature of from about 700 to about 775 degrees Celsius.

15. A process for recovering boron from a boron-containing material, comprising the steps of:
    a) forming a molten electrolyte comprising a boron-containing compound and a eutectic mixture comprising one of $MgF_2$—$NaMgF_3$—$LiF$ or $NaF$—$NaMgF_3$—$LiF$—, wherein said molten electrolyte is homogenized at a homogenizing temperature of at least about 750 degrees Celsius for a homogenizing period of time under a substantially inert atmosphere; and
    b) recovering elemental boron by electrolyzing said molten electrolyte at an electrolysis temperature from about 700 to about 775 degrees Celsius at a potential from about 1 to about 2 volts.

16. The process of claim 15, wherein said eutectic composition $MgF_2$—$NaMgF_3$—$LiF$ has a eutectic point at about 13 mole % NaF, about 61 mole % LiF, and about 26 mole % $MgF_2$.

17. The process of claim 15, wherein said eutectic composition $NaF$—$NaMgF_3$—$LiF$ has a eutectic point at about 43 mole % NaF, 46 mole % LiF, and 11 mole % $MgF_2$.

18. The process of claim 15, the homogenizing temperature is at least about 1330 and degrees Celsius and wherein the homogenizing period of time is at least about 0.5 hour.

19. The process of claim 15, wherein said boron-containing compound is selected from the group of boron-containing compounds consisting of $B_2O_3$, $NaBF_4$, $NH_4BF_4$, $KBF_4$, $LiBF_4$, and $CsBF_4$ and mixtures thereof.

20. The process of claim 15, wherein the homogenizing period of time is selected from the group of homogenizing times consisting of about 3, about 6, about 10 or about 24 hours.

21. The process of claim 15, wherein said recovered elemental boron has a purity level of at least about 50%.

* * * * *